United States Patent [19]
Ohtsuji et al.

[11] Patent Number: 5,303,814
[45] Date of Patent: Apr. 19, 1994

[54] FLEXIBLE SCREW TYPE CONVEYOR SYSTEM

[75] Inventors: Masaaki Ohtsuji; Takahisa Ito; Shuichiro Miyazaki, all of Amagasaki, Japan

[73] Assignee: Mitsubishi Cable Industries, Inc., Amagasaki, Japan

[21] Appl. No.: 59,849

[22] Filed: May 11, 1993

[30] Foreign Application Priority Data

May 26, 1992 [JP] Japan .................. 4-160449

[51] Int. Cl.$^5$ ............................. B65G 33/26
[52] U.S. Cl. .................... 198/659; 198/676; 198/722
[58] Field of Search ........... 198/657, 659, 676, 677, 198/722, 836.1

[56] References Cited

U.S. PATENT DOCUMENTS

| | | | |
|---|---|---|---|
| 2,620,917 | 12/1952 | Dahlberg | 198/659 |
| 2,908,379 | 10/1959 | Hamilton | 198/659 |
| 3,141,545 | 7/1964 | Holland, Jr. | 198/659 X |
| 4,969,348 | 11/1990 | Clowes et al. | 198/676 X |

FOREIGN PATENT DOCUMENTS

| | | | |
|---|---|---|---|
| 0606590 | 10/1960 | Canada | 198/659 |
| 0031427 | 2/1982 | Japan | 198/722 |
| 9106493 | 5/1991 | World Int. Prop. O. | 198/659 |

Primary Examiner—D. Glenn Dayoan
Assistant Examiner—James R. Bidwell
Attorney, Agent, or Firm—Armstrong, Westerman, Hattori, McLeland & Naughton

[57] ABSTRACT

A tubular guide body provided with a longitudinal slit portion has a flexible screw rotatably incorporated. A guiding portion of an object to be transported is brought into contact with the flexible screw through the slit portion. The flexible screw is rotated to exert forcing pressure upon the guiding portion of the object which is in contact with the flexible screw, thereby achieving the conveyance of the object in the longitudinal direction of the tubular guide body.

12 Claims, 8 Drawing Sheets

FLEXIBLE SCREW TYPE CONVEYOR SYSTEM

BACKGROUND AND SUMMARY OF THE INVENTION

1. Field of the Invention

The present invention relates to improvements in a flexible screw type conveyor system.

2. Description of the Related Art

A conventional conveyor system for transporting a variety of objects, for example, bottles and the like, is illustrated in FIG. 14 of the accompanying drawings. This illustrated conveyor system of the conventional type is provided with a flexible screw c and a flexible guide member d spaced apart from and in parallel with the flexible screw c at constant intervals of place to allow the transporting object e to be interposed therebetween. In the flexible screw c, a flexible shaft made of a magnetic metal is spirally wound with a wire type body b.

In operation, an object e to be transported is caught in a flange portion f thereof between the flexible screw c and the guide member d, and the flexible screw c is turned, to thereby force the flange portion f of the transported object e by using the wire type body b so that the transporting object e is conveyed in the direction of the arrowhead g.

Also, the flexible screw c is supported by means of a guide rail h provided along the flexible screw c. This is feasible because the guide rail h has a plurality of permanent magnets i embedded therein, and the magnetic force of these permanent magnets causes the flexible screw c to stick to the guide rail h.

Moreover, the guide member d is also provided with a guide rail (not shown) in parallel therewith, and this guide rail also includes a plurality of permanent magnets placed at constant intervals to allow the guide member d to be attracted by and supported on the guide rail.

In general, however, the permanent magnets i included or embedded in the guide rails h have cobalt magnets applied to them, and therefore, the guide rails, which comprise cobalt magnets, have a high manufacturing cost. In addition, owing to the magnetic force of the magnet i, a great amount of magnetic dust in the air is adsorbed on the surface of the guide rail h, and the guide rail h and the wire type body b are abraded with the magnetic dust. As a result, the wear of the guide rail and the wire type body are accelerated. Also, if the transported object is formed of the magnetic body, there is the risk that the transported object is magnetized by the magnet i. These are disadvantages of the illustrated conventional conveyor system.

Also, in another type of conveyor system (such as disclosed in the Japanese Utility-Model Publicizing Gazette No. 79-34978), the worm is operated, to thereby drive the wire with a screw in the longitudinal direction thereof, and as a result, the conveying means attached to this wire is allowed to travel. In this conveyor system, it is therefore necessary that the worm is provided, the pitch angle of the wire screw and that of the worm are brought into coincidence, and a single thread of the worm is cut away so that a hanger wire of the conveying means does not come into contact with the threads of the worm.

As is apparent from the foregoing description, this type conventional conveyor system is difficult to manufacture, and is required to advance the wire to the longitudinal direction thereof, thereby necessitating extremely great force to drive the wire.

It is therefore an object of the present invention to provide for improvements in the flexible screw type conveyor system, in which in order to overcome the foregoing disadvantages and problems of the conventional flexible screw type conveyor system, a conveyor system is simple in the overall construction thereof, easy to manufacture at a lower cost, and higher in the durability thereof, while at the same time, it does not magnetize the conveying object comprising a magnetic body.

BRIEF DESCRIPTION OF THE DRAWINGS

The present invention will be described with reference to the accompanying drawings, in which.

DETAILED DESCRIPTION OF THE PREFERRED EMBODIMENT

Several preferred embodiments of the present invention will now be described in detail with reference to the accompanying drawings.

Figure 1:
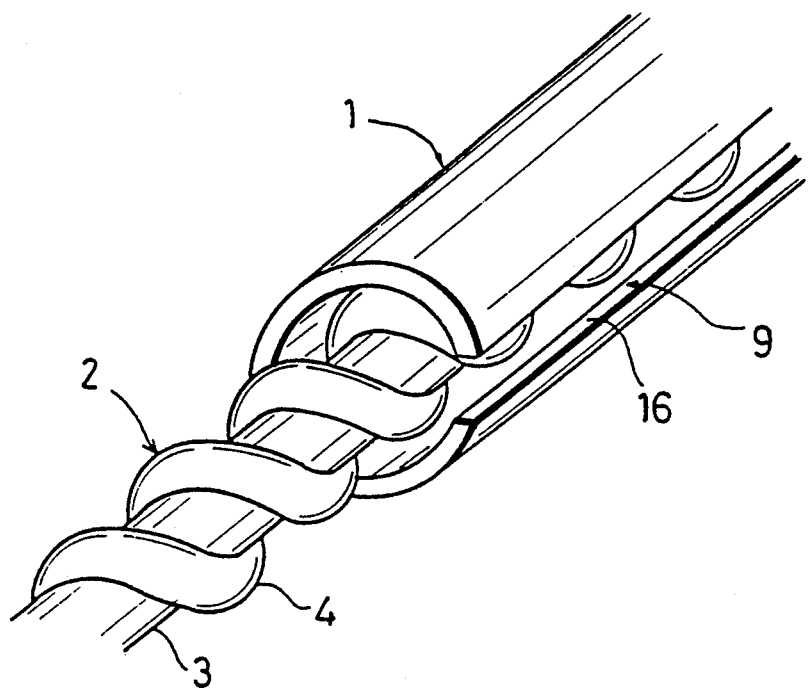
FIG. 1 is a perspective view of principal portions of a flexible screw means and a tubular guide body which form a flexible screw type conveyor system according to the preferred embodiments of the present invention.
Figure 2:
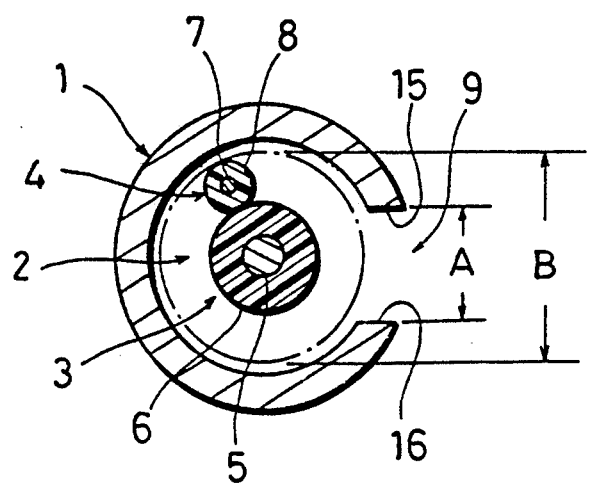
FIG. 2 is a cross sectional view of the flexible screw means and the tubular guide body which are illustrated in FIG. 1.

FIGS. 1 and 2 show a tubular guide body 1 which serves as a principal portion of the flexible screw type conveyor system of the present invention, and also, shows a flexible screw 2 rotatably incorporated therein.

In the present invention, a coiled body itself such as a boiled wire is applicable as the flexible screw. Alternatively applicable is a screw formed by providing shafting spirally with a coiled type or wire type body thereon or by making a continuous spiral groove on the surface of shafting. Preferably, a flexible screw previously invented by the applicant of the present application should be applied. (See PCT Application Gazette W091/06493.)

A screw shaft 3 employed in the present invention is applicable if it is furnished with dynamic rigidity which suffices to prevent its deflection under the rotation of the screw, and also to sufficiently transmit to the other end of the screw torque exerted from one end of the screw. However, if the screw shaft is furnished with not only the foregoing rigidity but also flexibility which facilitates the laying of the screw along any curved conveying course, this screw shaft is optimum for the screw of the conveying system according to the present invention. For example, therefore, the screw shaft 3 may be made from synthetic resin as a whole. However, in order to furnish the screw shaft with good flexibility, the screw shaft may have metallic wire woven onto the surface of the resin material thereof or may include a plurality of metallic wires in all directions within the resin material thereof or may incorporate a metallic body which serves as the core material thereof. However, in order to obtain superior flexibility and rigidity of the screw shaft, the screw shaft is more preferably made of a metallic rope 5 of known construction.

Examples of the metallic rope 5 include a steel wire, a nickel wire, a cobalt wire, or a wire made of an alloy of these metals can be given. The basic construction of this metallic rope 5 itself is that of a well-known steel wire. That is to say, the metallic rope 5 is constructed such that some or several tens of element wires are twisted into a strand, and the strand thus obtained has other strands twisted thereon. Preferably, the metallic rope 5 is constructed such that it comprises several layers of close-coiled wires. In this case, each layer comprises several wires for every pitch, and the wires of the respective layers are reverse in their winding directions between every two adjacent layers.

In order to twist the wires and strands into ropes, the wires are twisted by using the method generally called "Ordinaly Lay" or "Lang Lay" and the strands are twisted in the direction named "S Lay" or "Z Lay". In the present invention, one of the two wire lays and one of the strand lays are freely selected and employed in combination for the twisting of the wires and strands.

If the screw shaft 3 is the metallic rope 5, a wire type body 4 may be spirally wound directly on the metallic rope 5. In this case, however, there is the risk that the wire type body 4 is ground or abraded with the metallic rope 5. Also, the metallic rope 5 has a lubricant applied in advance thereto to reduce wear or abrasion of the element wires thereof which can be caused by their direct contact with one another, and there is another risk that the lubricant may evaporate. In order to prevent the grinding and evaporation of the lubricant, the metallic rope 5 is preferably mantled with a covering layer 6.

The original good flexibility of the metallic rope 5 is impaired according to an increase in the thickness of the foregoing covering layer 6. Therefore, the thickness of the foregoing covering layer 6 should be decreased to the utmost of the ability thereof with respect to the diameter of the screw shaft 3. For example, when the metallic rope 5 is 6.0 mm in the diameter thereof, the covering layer 6 is 0.1 mm to 2.0 mm or preferably 0.2 mm to 0.6 mm in thickness. Moreover, the covering layer, is desired to have the same thickness at any portion thereof to the utmost of the ability thereof to enhance the concentricity thereof. Specifically, if the value given by the formula $(t_{max} - t_{min})/t$ in which the letter t represents the thickness of the covering layer 6 is 0.1 or below or preferably 0.05 or below, the thickness requirement of the covering layer 6 is satisfied. Any screw in which this thickness requirement of the covering layer is met is capable of rotating at a higher speed.

The covering layer 6 may be formed by using the extrusion-coating technique. For example, as the electric wires are sheathed with an insulation material, the metallic rope 5 is advanced in a single direction under fixed tension, while at the same time, the coating material of resin is fusion-extruded from extrusion-die located in the configuration of a shaft in the advancing direction of the metallic rope 5 to allow the resin to cover the metallic rope 5.

In operation, the screw is usually furnished with torque from one end thereof to allow it to be rotated as a whole. Therefore, from the viewpoint of torque transmissibility, it is important that the metallic rope 5 and the covering layer 6 which form the screw are rotated in the form of a single unit. In order to meet this requirement, the screw is desired to be constructed such that the contact areas of the metallic rope 5 and the covering layer 6 with each other are great, and the covering layer 6 does not slide along the metallic rope 5. Such construction of the screw is achieved, for example, by providing the surface of the metallic rope with a suitable number of juts, winding wire spirally onto the metallic rope 5 or fitting the surface of the metallic rope 5 with flanges or by making any other similar provisions in the metallic rope.

On the other hand, the material of or from which the wire type body 4 spirally attached to the surface of the foregoing screw shaft 3 is made may be metal or resin. However, for the following reason, it is favorable to the maintenance of the conveyor system of the present invention that at least a surface layer 8 of the wire type body 4 is formed of resin.

In the conveyor system of the present invention, the flexible screw 2 is rotatably incorporated in the tubular guide body 1. Therefore, when the screw is rotated, the wire type body 4 slides against the inner surface of the tubular guide body 1, and as a result, friction is markedly generated, and this causes great wear or abrasion of the wire type body 4 and the inner surface of the tubular guide body 1.

Under the circumstances, in order to prevent the generation of wear or abrasion of the wire type body 4 and the tubular guide body 1 to the utmost of their ability so that their maintenance cost is greatly reduced, it is more effective and favorable that the surface 8 of the wire type body 4 is made from resin rather than of metal.

Also, the wire type body 4 is preferably provided with a reinforcing core 7 in the central portion thereof which comprises a bundle of fibers as illustrated in FIG. 2. The wire type body 4 provided with the reinforcing core 7 is capable of preventing elongation thereof which results from frictional heat thereof and a tensile load thereon. As a result, when the wire type body 4 having the reinforcing core in the central portion thereof is spirally wound around the surface of the screw shaft, it is feasible to prevent any irregularity in the pitch of the wire type body 4. This is favorable or advantageous to the trouble-free operation of the screw. In the present invention, it is suitable that the buckling rate of reinforcing core 7 in the wire type body 4 is 3.0% or below.

The foregoing buckling rate is given by the equation $\epsilon = (L-L_0)/L_0 \times 100$ (%) in which L is the length of the reinforcing core 7, whose surface layer 8 has been removed from the wire type body 4, and which is tensed with force of 1/1000 of the tensile strength thereof. $L_0$ is the initial length of the reinforcing core 7 with the surface layer 8 attached thereto.

Whenever the buckling rate of the reinforcing core 7 exceeds 3.0% and if the reinforcing core 7 contracts, the wire type body 4 easily elongates by the contracting portion of the reinforcing core 7 when the reinforcing core is subjected to tension. For this reason, the buckling rate of the reinforcing core 7 should be less than 3.0%, preferably less than 0.3%, more preferably less than 0.1%, or ideally less than 0.05%. The wire type body 4 including the reinforcing core of such a range of buckling rate is almost free from any elongation thereof in the practical use thereof.

The present invention, being thus described, it may be varied in many ways. For instance, L may be smaller than the initial length $L_0$, whereby the buckling rate $\epsilon$ has a negative value.

In the foregoing case in which the length L is smaller than the length $L_0$, the is reinforcing core 7 in the polymercord (surface layer 8) is forceably elongated to a greater length than the appropriate length thereof, and if the surface layer 8 is removed from the wire type body 4 for measuring the buckling rate, the reinforcing core 7 is relieved from the forced elongation thereof whereby the reinforcing core 7 contracts. If the length L of the reinforcing core 7, which is tensed with force of 1/1000 of the tensible strength thereof after contracted, is shorter than the initial length $L_0$ of the reinforcing core 7 til covered with the surface layer 8, the value of $(L-L_0)$ is minus. If the absolute value of the minus buckling rate $\epsilon$ is extremely great, the reinforcing core 7 may be cut during the operation thereof. However, the buckling rate $\epsilon$ is preferably greater than $-0.5\%$. or particularly $-0.1\%$.

The material fiber of which the reinforcing core 7 is made is not limited to any particular material provided that it serves as a tension member of the wire type body 4. The following are several examples of this material fiber; a natural fiber such as a plant fiber, for example, cotton, flax, hemp, and coconut fiber; an animal fiber, for example, wool, and silk; semi-synthetic fiber, for example, acetate; a synthetic fiber, for example, 6-nylon or other polyamide fiber; a polyester fiber, for example, "Kevlar" made by E. I. du Pont de Nemours & Co., "Tetron" made by Toijin Limited; polyacrylonitrile synthetic fiber, for example, acryl fiber, "Modacryl fiber"; polyvinylalcohol fiber; polyvinyl chloride synthetic fiber; polyvinylidene chloride synthetic fiber; polyolefine synthetic fiber, for example, polyethylene, polypropylene; polyurethane synthetic fiber; inorganic fiber, for example, glass fiber, graphite fiber, boron fiber, various metallic fiber. "Kevlar" in particular is suitable for a material fiber of the reinforcing core because of the greater strength, higher fatigue resistivity, superior heat resistivity and lower creeping property thereof.

The reinforcing core 7 is usually formed by twisting a great number of fibers into a bundle. The bundle of the fibers is 1000 denier to 15000 denier or preferably 1500 denier to 9000 denier in thickness, depending on the material fiber of which the reinforcing core 7 is made, and the diameter of the cord. Also, the fibers which are twisted into a bundle are 666 to 10000 or preferably 1000 to 6000 in number.

The material from which the entire screw shaft 3, or the covering layer 6 on the metallic rope 5 is made, and also the material from which the wire type body 4 is made, are respectively unlimited to any particular organic or inorganic resin. Several examples of applicable organic or inorganic resins are given in the following. Polyolefine or copolymer thereof such as polyethylene, for example, ultrahigh molecular weight polyethylene (UHMWPE of usually a million or above or preferably 1.65 million or above in molecular weight), low molecular weight polyethylene, high molecular weight polyethylene and the like; polypropylene, polyalkylene or copolymer thereof, for example, ethylenevinyl-acetate copolymer (EVA), ethylene-acrylic acid ethyl copolymer (EEA), polyether such as polyacetal, polyphenylene ether and the like; polyamide such as 6-nylon, 6,6-nylon, 11-nylon and the like; fluorocarbon resin such as polytetrafluoro-ethylene (PTFE), tetrafluoroethyleneperfluoroalkylvinyl-ether copolymer and the like; polyester such as polyethylen-terephthalate, polybutyleneterephthalate or the like.

The Japanese Patent Application Opening Gazettes (to Public Inspection) Nos. 10647/1985 and 12606/1985 disclose ultra-high molecular weight modified polyethylene (UHMWPE). This modified polyethylene is an example of the foregoing UHMWPE. This ultra-high molecular modified polyethylene is commercially available as products manufactured, for example, by Mitsui Petrochemical Industries, Ltd. under, the trademark Lubmer (Lubmer L5000, Lubmer L4000 and Lubmer L3000).

In the present invention, the wire type body 4 is desired to be furnished with high wear or abrasion resistance on the surface thereof. In order to furnish the surface of the wire type body with high wear or abrasion resistance, the wire type body surface should be $5 \times 10^{-4}$ mm$^3$/kg-m or below or preferably $5 \times 10^{-5}$ mm$^3$/kg-m or below in the specific wear rate thereof under the condition that the wire type body is subjected to surface pressure of 3 kg/cm$^2$, the sliding speed (peripheral speed) of the wire type body is 33.3 m/min, the sliding time of the wire type body is 168 hours, and the mating portion thereof is made of stainless steel specified as SUS 304 in the standards "JIS".

Moreover, in order to enhance the durability of the screw, the wire type body 4 should meet the requirement in which the surface thereof is made from a resin of 0.4 or, below or preferably 0.2 or below in the coefficient of dynamic friction.

The coefficient of dynamic friction as referred to herein is that of the wire type body against steel of 6 μm in the surface roughness thereof (Rz), and signifies mainly the coefficient of sliding friction under the condition that the wire type body is subjected to surface pressure of 7.5 kg/cm², and the sliding speed thereof is 12 m/min.

In order to manufacture the screw, the wire type body 4 is spirally provided on the surface of the flexible shaft 3. This is attained by forming the wire type body 4 and the shaft 3 into a single body, or winding the wire type body 4 on the screw shaft 3 which is separately manufactured from the wire type body. In the latter case, the wire type body 4 is fixed by using adhesion or fusion when or after being wound onto the screw shaft 3.

When the wire type body 4 is wound on the screw shaft 3, in order to prevent any irregularity in the pitch of the wire type body 4, the winding of the wire type body around the screw shaft 3 should be conducted such that the wire type body is slightly sunk into the surface layer of the screw shaft 3 if the surface layer of the screw shaft is made from resin.

Alternatively, in order to obviate any irregularity in the pitch of the wire type body around the screw shaft 3, it is suitable that the screw shaft 3 is formed with spiral grooves for the fixation of the wire type body. The spiral grooves allow the wire type body 4 to be fitted in them and wound around the screw shaft 3, and in this case, therefore, at the time of rotation of the screw, the pitch of the wire type body is much more decreased in irregularity thereof than when the wire type body 4 is merely wound on the screw shaft 3.

Moreover,, in order to ensure the prevention of irregularity in the wire type body, when at least the surface layer of the screw shaft 3 and the entire wire type body 4 are made from resin, the surface layer and the wire type body are both desired to be formed into a single body. Alternatively, the wire type body 4 is wound around the screw shaft 3, and thereafter, the screw shaft including the wire type body is covered with a baking-finished coating which comprises polymer, or with a resin layer 6 which comprises a thermal-shrinking tube.

Next, the tubular guide body 1 is provided with a slit portion 9 which continuously extends longitudinally (axially), and this slit portion is substantially C-shaped in the cross sectional configuration. That is to say, the slit portion 9 is opened laterally of the tubular guide body 1, and end surfaces 15 and 16 of the slit portion 9 are arranged to be opposed to each other.

The opening width A of the slit portion 9 is even in any portion thereof in the longitudinal direction thereof.

The opening width A of the slit portion 9 is such that the requirement of $A < 0.9 \times B$ is met, in which the letter B represents the outside diameter of the flexible screw 2, to thereby prevent any detachment of the flexible screw from the tubular guide body 1 through the slit portion 9.

The tubular guide body 1 may be made of an alloy of light weight, a suitable degree of flexibility and rigidity or from rigid plastics of the same property as the foregoing alloy or any other similar material.

The tubular guide body 1 has the flexible screw 2 held therein along and in close proximity to or in slidable engagement with the inner circumferential surface thereof such that the flexible screw pivots about the axis thereof.

Figure 3:
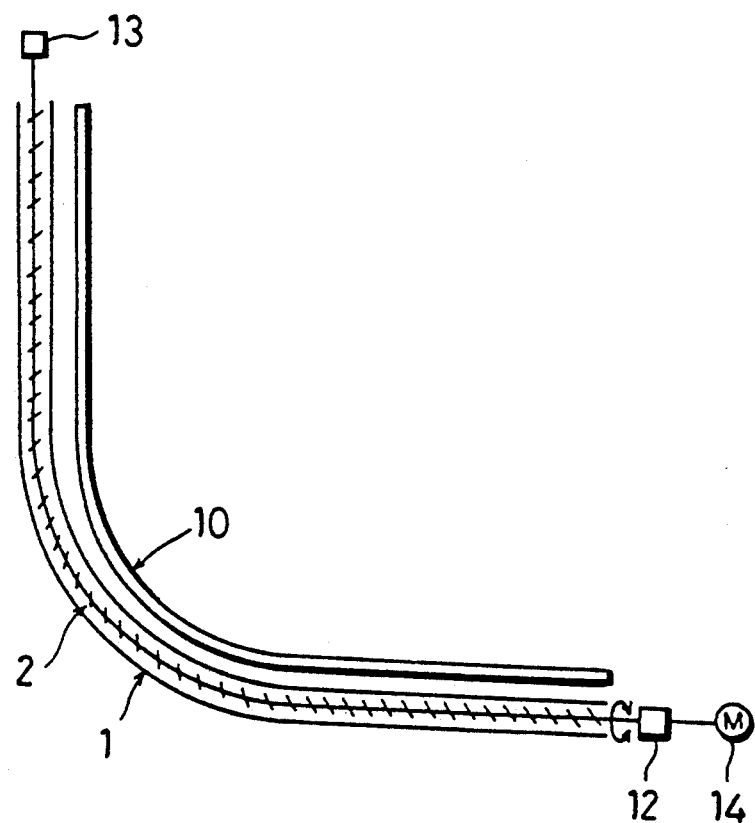
FIG. 3 is a schematic plan view which shows the flexible screw type conveyor system according to a first preferred embodiment of the present invention.
Figure 4:
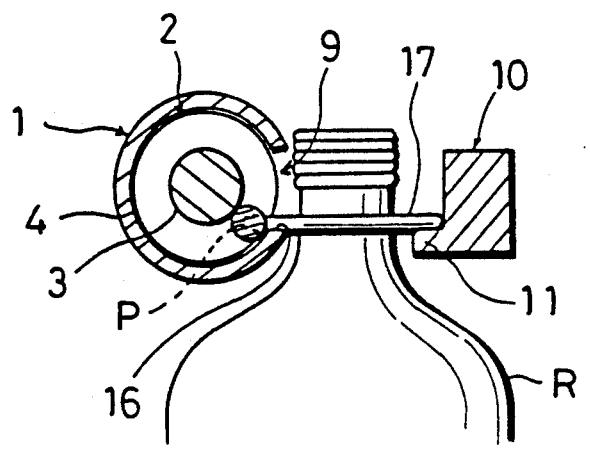
FIG. 4 is a cross sectional view of a principal portion of the conveyor system shown in FIG. 3.

FIGS. 3 and 4 show a first preferred embodiment of the present invention in which the flexible screw type conveyor system comprises the tubular guide body 1 and the flexible screw 2. In this first preferred embodiment of the present invention, the flexible screw type conveyor system is capable of conveying the transporting object R which is provided with a flange portion 17 such as a bottle or any other type container shown in FIG. 4.

Specifically, as shown in FIG. 3, the tubular guide body 1 is mounted on the flexible screw 2 over, the substantially entire length thereof such that the tubular guide body 1 covers the flexible screw 2 in the form of a sleeve to the flexible screw 2, and the tubular guide body 1 is curved in the substantially middle portion thereof to a predetermined radius of curvature. Both end portions and their adjacent portions of the tubular guide body are formed in a configuration of a straight line. The tubular guide body 1 may be partially provided with other opening portion than the slit portion 9 unless it badly affects the conveyance of the transported object R. For example, the tubular guide body is allowed to be provided with a window portion (a notched portion) on an opposite side wall surface portion thereof to the slit portion 9 thereof, whereby the tubular guide body wall only remains near the slit portion 9.

A guide member 10 which functions to guide the transported object R is opposed to the slit portion 9 laterally opened in the tubular guide body 1, and this guide member 10 is provided with a lip portion 11 which is engaged with the flange portion 17 of the transported object R to support the transported object R. This lip portion 11 juts out towards the slit portion 9 located on a side of the tubular guide body 1, or on the right hand side thereof in FIG. 4.

The guide member 10 is located along, at a fixed spacing from, and in parallel with the tubular guide body 1, and also, this guide member 10 and the tubular, guide body 1 are supported with (not described) supporting members or the like, to thereby form a conveying passage for the transported object R.

Also, the flexible screw 2 is rotatably supported in both ends thereof by means of bearings 12 and 13, and an end portion of the flexible screw 2 which rests upon one bearing 12 is connected to an electric motor 14. See FIG. 3.

As n in FIG. 4, the flange portion 17 of the transported object R is slidably hung and held on the lower end surface 16 of the tubular guide body 1 and the upper surface of the lip portion 11 of the guide member 10. A guiding portion P of the flange portion 17 of the transported object is inserted into the tubular guide body 1, through the slit portion 9, and is brought into contact with the wire type body 4 of the flexible screw 2.

Thus, the transported objects R are respectively hung on the tubular guide body 1, and the guide member 10 and every predetermined or desired pitch of the wire type body 4, and in this state, the flexible screw 2 is rotated in a predetermined direction by using the electric motor 14 to exert continuous pressure upon the guiding portion P of the flange portion 17 by using the wire type body 4. As a result, each transported object R is conveyed in the longitudinal direction of the flexible screw 2.

Figure 5:
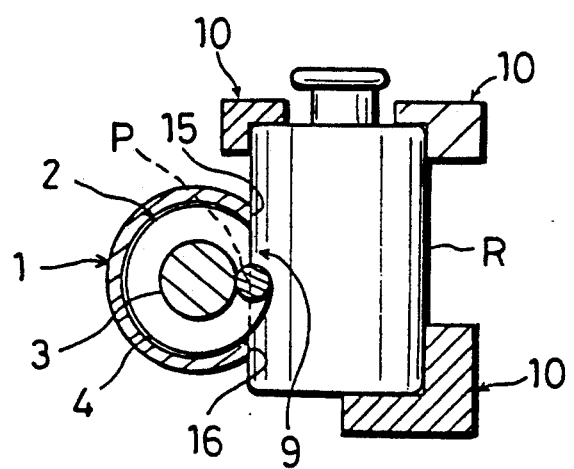
FIG. 5 is a cross sectional view of a principal portion of the flexible screw type conveyor system according to a second preferred embodiment of the present invention.

FIG. 5 shows a second preferred embodiment of the present invention. In FIG. 5, the conveying passage of the flexible screw type conveyor is arranged to convey the cylindrical or columnar transported object R such as a bottle or a can in an upright, vertical position thereof.

In this second preferred embodiment of the present invention, the transported object R has the guide member 10 applied to both shoulder portions and a bottom corner portion thereof to prevent any fall thereof in transit. This guide member is substantially L,-shaped in the cross section thereof. Both end surfaces 15 and 16 of the tubular guide body I are arranged to come into slidable contact with the outer circumferential surface of the transported object R.

With such arrangement, if the transported object R is inserted between the tubular guide body 1 and the guide members 10 as shown in FIG. 5, the guiding portion P on the outer circumferential surface of the transported object R is brought into contact with the wire type body 4 of the flexible screw 2 in rotation, and as a result, the guiding portion P is forced through the slit portion 9. This allows the transporting object to be conveyed along and between the guide members 10 and the end surfaces 15, 16 of the tubular guide body 1.

Figure 6:
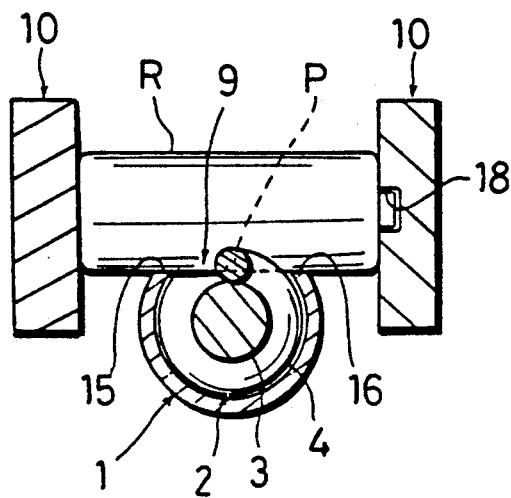
FIG. 6 is a cross sectional view of a principal portion of the flexible screw type conveyor system according to a third preferred embodiment of the present invention.

FIG. 6 shows a third preferred embodiment of the present invention. In this third preferred embodiment, the conveying passage is arranged to convey the cylindrical or columnar transported object R such as a circular can, a round bottle, an electric cell or the like while the same transported object R is horizontally laid.

In order to guide the transported object R and to prevent any rotation thereof about the substantially vertical axis thereof, the guide members 10 which are formed in a strip-shaped configuration in this third preferred embodiment of the present invention are located on both end sides of the transported object such that the guide members come into close contact with the end surfaces of the transported object R. A recess 18 is formed at a longitudinal end portion of one of the guide, members 10 to receive a jutting portion of the transported object R.

Also, in the third preferred embodiment of the present invention, the tubular, guide body 1 is arranged so that the slit portion 9 is located in an upper portion thereof. That is say, the outer circumferential surface of the transported object R is brought into a sliding contact with the end surfaces 15, 16 of the tubular guide body 1, and the guiding portion P which forms a part of the outer circumferential surface of the transported object R is brought into contact with the wire type body 4 of the flexible screw 2 through the slit portion 9, and is forced. As a result, the transported object R is guided and conveyed by means of the end surfaces 15, 16 of the tubular guide body 1 and the guide members 10.

Figure 7:
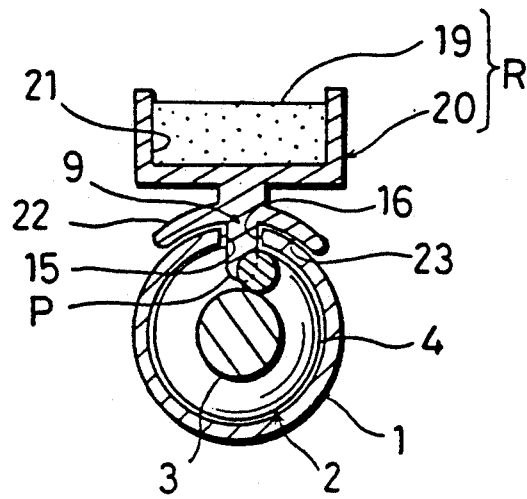
FIG. 7 is a cross sectional view of a principal portion of the flexible screw type conveyor system according to a fourth preferred embodiment of the present invention.
Figure 8:
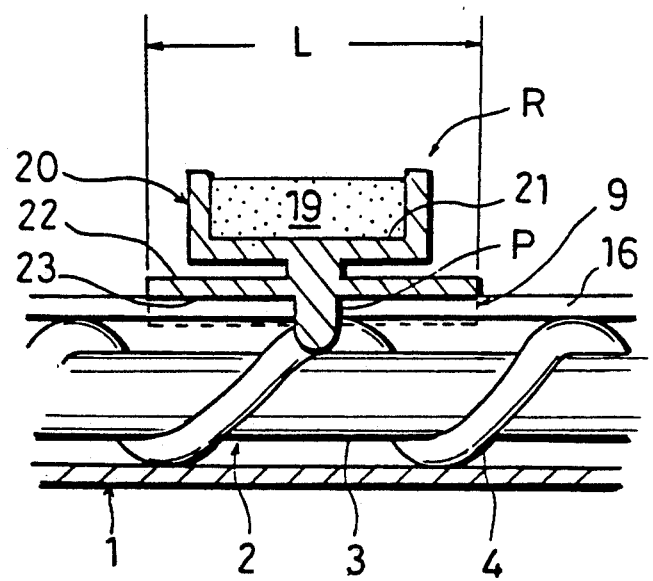
FIG. 8 is a cross sectional side view of a principal portion of the flexible screw type conveyor system shown in FIG. 7.

FIGS. 7 and 8 show a fourth preferred embodiment of the present invention. In the flexible screw type conveyor system according to this fourth embodiment of the present invention, the transported object R comprises a carrier 20 which contains a powdery or granular material 19 or other similar material therein.

The carrier 20 comprises an upwardly opened container portion 21 for entering the material 19, a supporting portion 22 which is brought into sliding contact with an upper portion of the tubular guide body 1, and a guiding portion P of small size which extends downwardly as a vertical bar.

The supporting portion 22 is furnished with predetermined longitudinal length L and also a sliding curved surface 23 along an upper outer circumferential surface of the tubular guide body 1. Also, the slit portion 9 of the tubular guide body 1 is provided in an upper portion thereof. The end surfaces 15 and 16 of the tubular guide body 1 and the guiding portion P of the carrier are located in proximity with each other or such that the guiding portion P of the carrier comes into sliding contact with the end surfaces 15 and 16.

The foregoing arrangement allows the guiding portion P to be brought into contact with the wire type body 4 of the rotating flexible screw 2, and is subjected to forcing pressure, Thereby achieving the conveyance of the transported object R along the slit portion 9 of the tubular guide body 1.

In this case, the movement of the transported object R is restricted by the support of portion 22 and the guiding portion P, thereby preventing any fall of the transported object R.

As a result, any of the material 19 does not come out of the container portion 21 in transit.

Also, the flexible screw type conveyor system according to this fourth embodiment of the present invention is constructed such that the transported object R is located over the tubular guide body 1 and the flexible screw 2, and this does not necessitate any guide member of the transported object R. That is to say, the conveying passage can be compact-sized.

Figure 9:
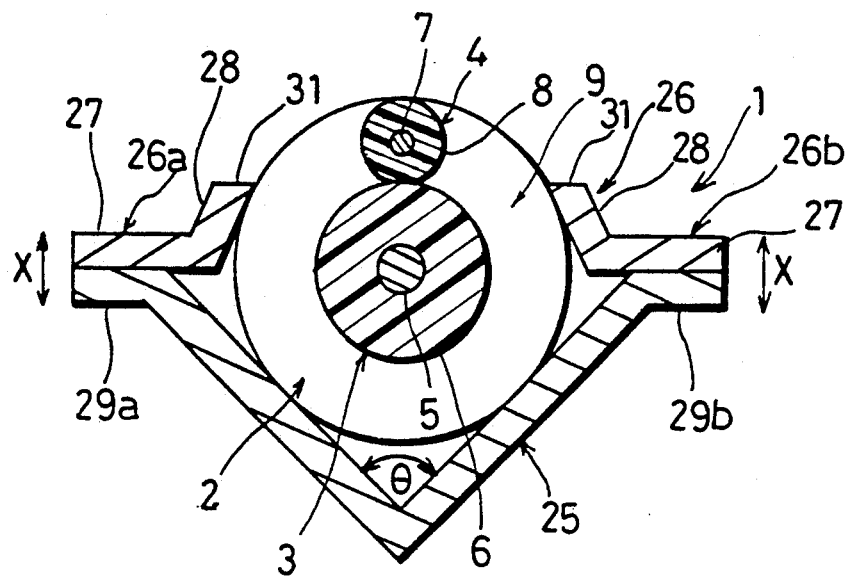
FIG. 9 is a cross sectional side view of a principal portion of the flexible screw type conveyor system according to a fifth preferred embodiment of the present invention.

FIG. 9 shows a fifth preferred embodiment of the present invention. In this fifth preferred embodiment, the tubular guide body 1 comprises a body member 25 and a secondary body member 26 attached thereto. The body member 25 is made of a plate member in a V-shaped cross sectional configuration.

The secondary body member 26 comprises a pair of plate members 26a, 26b, and these plate members 26a, 26b respectively comprise a horizontal portion 27 and a sloping portion 28 protruded from the inside end of the horizontal portion 27. The horizontal portions 27 and the horizontal flange portions 29a, 29b of the body member 25 are joined together into a single body. As a result, the secondary body members 26 form a longitudinal slit portion 9 in the guide body 1.

Figure 10:
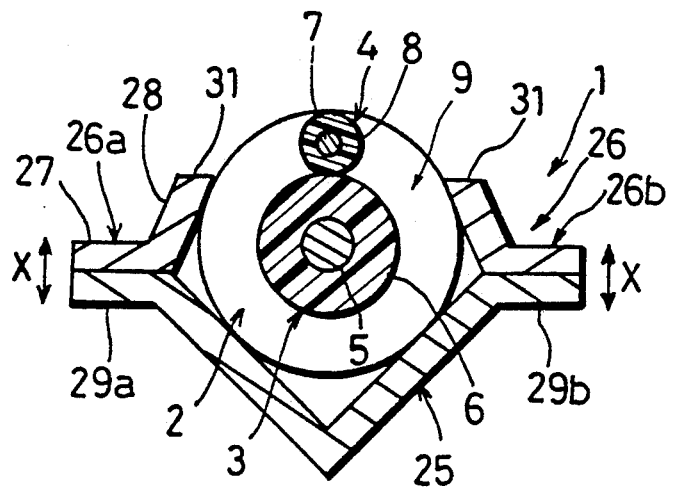
FIG. 10 is a cross sectional side view of a principal portion of the conveyor system shown in FIG. 5, which gives an example of a modification of the fifth preferred embodiment of the present invention.

In the tubular guide body 1 shown in FIG. 9, the inside end portions of the plate members 26a, 26b extend more deeply into the tubular guide body 1 than those of the horizontal flange portions 27 of the body member 25. Alternatively, as shown in FIG. 10, the inside end portions of the plate members 26a, 26b may be aligned with those of the horizontal flange portions 27.

Figure 11:
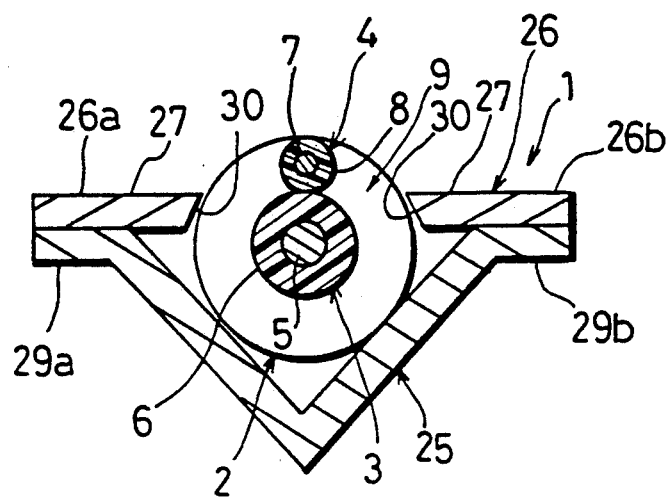
FIG. 11 is a cross sectional side view of a principal portion of the conveyor system shown in FIG. 5, which shows another example of a modification of the fifth preferred embodiment of the present invention.

Also, as illustrated in FIG. 11, the plate members 26a, 26b may comprise the horizontal portions 27 alone without the sloping portions 28. In this case, the inside end surfaces 30 of the horizontal portion 27 are formed with sloping.

Figure 12:
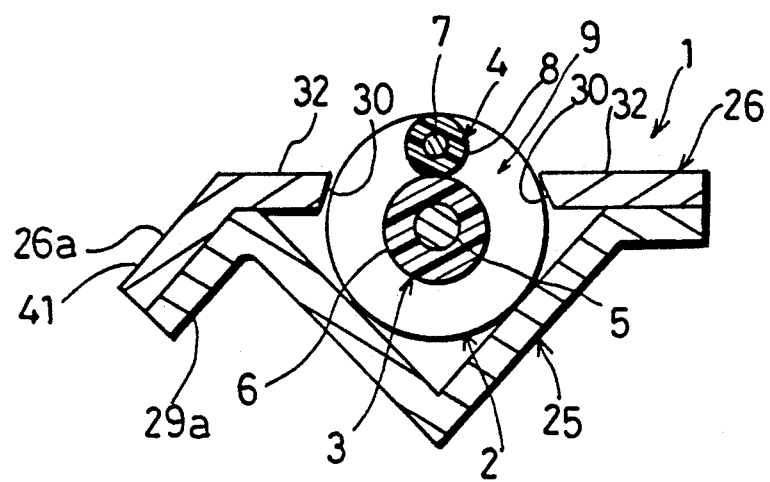
FIG. 12 is a cross sectional side view of a principal portion of the conveyor system shown in FIG. 5, which shows still another example of a modification of the fifth preferred embodiment of the present invention.

Moreover, as shown in FIG. 12, one flange portion 29a of the body member 25 may be sloped, and the corresponding plate member 26a may be accordingly sloped in an outside end portion 41 thereof to the sloping angle of the flange portion 29a.

Therefore, in any of the tubular guide bodies 1 shown in FIGS. 9 to 12, the guiding portion P of the transported object R is brought into contact with the wire type body 4 of the flexible screw 2 in rotation, to thereby force the guiding portion P of the transported object R. Consequently, the transported object R is conveyed in the longitudinal direction of the tubular guide body 1.

Specifically, in the tubular guide body 1 shown in each of FIGS. 9 and 10, for example, a columnar transported object R as illustrated in FIG. 6 which shows the third preferred embodiment of the present invention is loaded upon end surfaces 31 of the secondary body member 26, and the guiding portion P which forms a part of the outer circumferential surface of the transported object is brought into contact with the wire type body 4.

Also, in the tubular guide body 1 shown in each of FIGS. 11 and 12, for example, a columnar transporting object R is loaded upon upper surfaces 32 of the secondary body member, 26, and the guiding portion P which forms a part of the outer circumferential surface of the transported object is brought into contact with the wire type body 4 through the slit portion 9 cf the tubular guide body 1.

As is apparent from the foregoing description, the tubular guide body 1 shown in each of FIGS. 9 to 12 is formed by joining the body member 25 and the secondary body member 26 together into a single body. Therefore, it is quite easy to manufacture this tubular guide body 1. Also, this tubular guide body can be easily curved in the directions shown by means of the arrowhead X in FIG. 9, and this allows the easy formation of the curved portion of the conveying passage.

Figure 13:
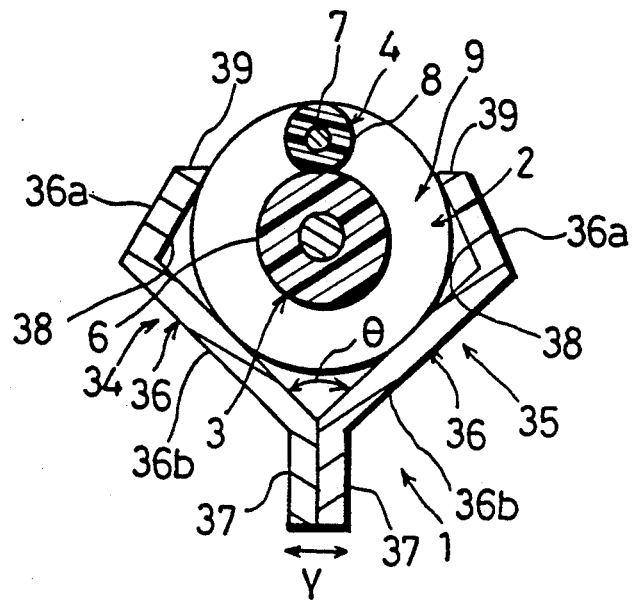
FIG. 13 is a cross sectional side view of a principal portion of the flexible screw type conveyor system according to a sixth preferred embodiment of the present invention.
Figure 14:
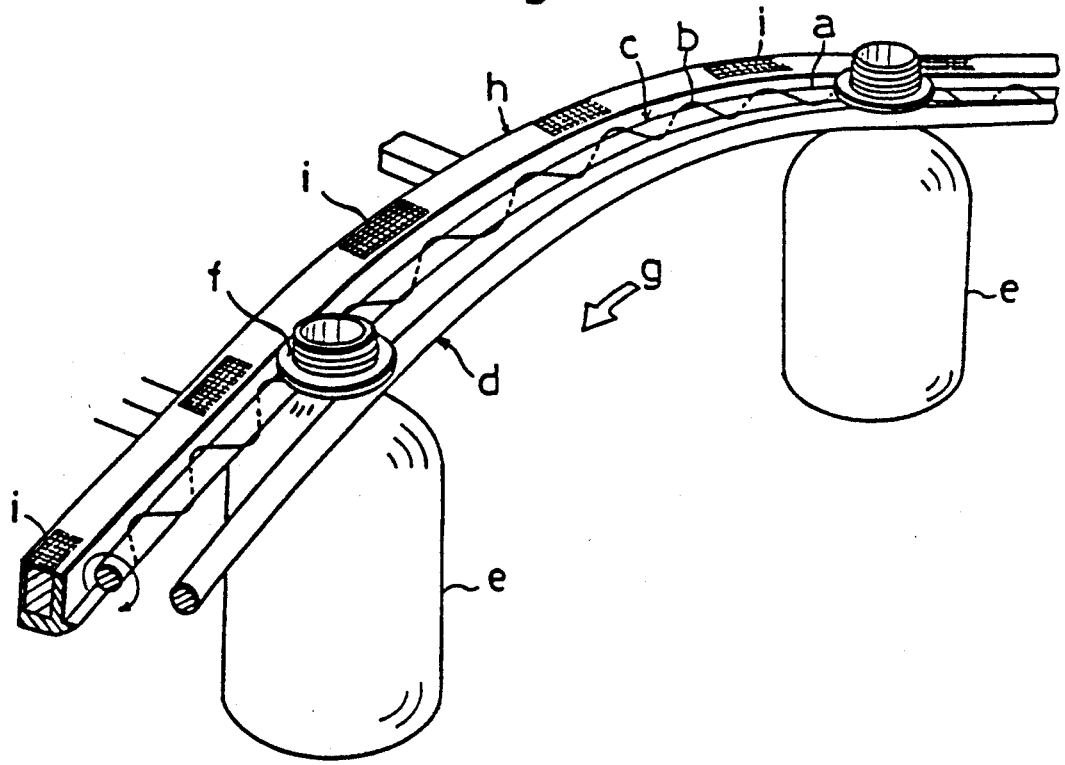
FIG. 14 is a perspective view of a principal portion of a conventional flexible screw type conveyor system according to the prior art.

FIG. 13 shows a sixth preferred embodiment of the present invention, and the tubular guide body 1 according to this embodiment comprises a first body member 34 and a second body member 35.

The first body member 34 and the second body member 35 respectively comprise a body portion 36 in a substantially V-shaped cross sectional configuration, and a flange portion 37. The body portion 36 comprises a first element portion 36a of small size and a second element portion 36b of large size. The flange portion 37 extends directly from the lower end of the second element portion 36b of large size.

The flange portions 37 are joined together into a single body so that bent portions 38 of the body portion 36 are opposed to each other. With such arrangement, in the sixth preferred embodiment of the present invention, the tubular guide body I also has the slit portion 9 formed in the longitudinal direction thereof.

Therefore, the tubular guide body 1 according to the sixth preferred embodiment of the present invention also has the same operation and effect as that shown in FIGS. 9 to 11 if, for example, a columnar transporting object R is loaded upon end surfaces 39 of the first body member 34 and the second body member 35, and the guiding portion P of the transported object which forms a part of the outer circumferential surface of the transporting object is brought into contact with the wire type body 4 through the slit portion 9.

The tubular guide body 1 according to the sixth preferred embodiment of the present invention is easy to manufacture as that shown in FIGS. 9 to 12, and can be easily curved in the direction indicated by means of the arrowhead Y in FIG. 13.

While the tubular guide body 1 shown in FIGS. 9 to 13 has the slit portion 9 located in an upper portion thereof, this slit portion 9 may be arranged in a lateral portion thereof.

The flexible screw type conveyor system according to the present invention is arranged as described in the foregoing. Therefore, this conveyor, system produces the following favorable effects.

The flexible screw 2, the tubular guide body 1 and their adjacent portions are not provided with permanent magnets which are used in the conventional flexible screw type conveyor system previously described herein. For this reason, the flexible screw 2 and the tubular guide body 1 do not adsorb magnetic dust in the air. This prevents any extreme abrasion or wear of the flexible screw 2 and the tubular guide body 1, and improves their durability. As a result, the flexible screw type conveyor system according to the present invention has a longer life.

Also, even if the transported object R comprises a magnetic material, the conveyor system of the present invention is capable of conveying it preventing the transported object R from magnetized.

Moreover, in the present invention, the tubular guide body 1 can be manufactured at a lower cost because of the simple construction thereof. This reduces the manufacturing cost of the entire conveyor system.

Also, in the present invention, the tubular guide body 1 is arranged to obviate any deflection of the flexible screw 2. The conveying passage of the flexible screw 2 is compact-sized, to thereby allow weighty materials to be conveyed.

Although the present invention has been fully described by way of examples with reference to the accompanying drawings, it is to be noted here that various changes and modifications will be apparent to those skilled in the art. Therefore, unless otherwise such changes and modifications depart from the scope of the present invention, they should be construed as being included therein. For example, the following changes or modifications are included in the scope of the present invention.

The transported object R is changed to other types than described in the foregoing for each preferred embodiment of the present invention, such as spherical transporting object.

In the first, second and third preferred embodiments of the present invention which are shown in FIGS. 4 to 6, the transported object R can be conveyed in the upward or downward sloping direction as well as in the horizontal direction, thereby obtaining a three-dimensional conveyance.

Also, in the preferred embodiments shown in FIGS. 4 and 5, the flexible screw 2 and the tubular guide body 1 can be separately arranged on the left hand side and on the right hand side of the transported object R such that they are symmetrically located, to thereby form the conveying passage.

Moreover, in the tubular guide body 1 shown in FIGS. 9 to 13, the angle at which a V-shaped groove is formed can be freely changed. Preferably, this angle is approximately 90 degrees.

We claim:

1. A flexible screw type conveyor system for transporting an object, comprising:
   a tubular guide body having a longitudinal slit portion;
   a flexible screw rotatably inserted in said tubular guide body, and brought into contact with a guiding portion of the object through the slit portion, to thereby convey the object longitudinally of the tubular guide body by rotation of said flexible screw about the axis thereof
   wherein said flexible screw comprises a flexible shaft and a wire-type body spirally wound thereto, both said flexible shaft and said wire-type body respectively having first and second covering layers made of synthetic resin.

2. The flexible screw type conveyor system as set forth in claim 1, wherein the tubular guide body is substantially C-shaped in the cross sectional configuration thereof.

3. The flexible screw type conveyor system as set forth in claim 1, wherein the tubular guide body comprises a primary body member consisting of a plate member of a substantially V-shaped cross section, and a secondary body member consisting of a pair of plate members attached to the body member to form a longitudinal slit portion.

4. The flexible screw type conveyor system as set forth in claim 1, wherein the tubular guide body comprises a first body member and a second body member, respectively, joined together to form a body portion having a substantially V-shaped cross sectional configuration, said first body member and said second body member each having two element portions which differ in length, and a flange portion extending directly from the body portion, wherein the first body member, the second body member and the flange portion are joined together so that bent portions of the body portion are opposed to each other, and the first body member and the second body member are united into a single body at the flange portions.

5. The flexible screw type conveyor system as set forth in claim 1, wherein the shaft comprises a metallic rope formed by twisting a plurality of element wires, and wherein said first covering layer is formed on the surface of the metallic rope, while at the same time, the wire type body comprises a reinforcing core made of a bundle of fibers, and wherein said second covering layer is formed on the reinforcing core.

6. The flexible screw type conveyor system as set forth in claim 1, wherein the opening width A of the slit portion is such that the replacement of $A < 0.9 \times B$ is met, in which the letter B represents the outside diameter of the flexible screw.

7. The flexible screw type conveyor system as set forth in claim 1, wherein the slit portion of the tubular guide body is located along a lateral portion thereof.

8. The flexible screw type conveyor system as set forth in claim 1, wherein the slit portion of the tubular guide body is located along an upper portion thereof.

9. The flexible screw type conveyor system as set forth in claim 1, wherein the object to be transported is provided with a horizontal flange portion, while at the same time, a part of the flange portion is a guiding portion thereof which is to be brought into contact with the wire type body of the screw shaft, and said flange portion is received by means of a lower end surface of the slit portion and said guiding portion, which is located so as to be opposed to said guide member.

10. The flexible screw type conveyor system as set forth in claim 7, wherein the object to be transported is a cylindrical or columnar body vertically arranged, a part thereof is a guiding portion thereof brought into contact with the wire type body of the screw shaft, and a guide member is provided to support the bottom surface of the object.

11. The flexible screw type conveyor system as set forth in claim 8, wherein the object to be transported is a cylindrical or columnar body horizontally arranged, a part thereof is a guiding portion thereof with the wire type body of the screw shaft, and the slit portion holds with both end surfaces thereof the outer circumferential surface of the transporting object.

12. The flexible screw type conveyor system as set forth in claim 8, wherein the object to be transported comprises an upwardly opened container portion for a powdery or granular material, a supporting portion which is brought into sliding contact with an upper portion of the tubular guide body, and a guiding portion P of small size which extends downwardly as a vertical bar from the supporting portion.

* * * * *